US010640653B2

(12) United States Patent
Gane et al.

(10) Patent No.: US 10,640,653 B2
(45) Date of Patent: *May 5, 2020

(54) SUSTAINABLE ADSORBABLE POLYMERS

(71) Applicant: Omya International AG, Oftringen (CH)

(72) Inventors: Patrick A. C. Gane, Rothrist (CH); Matthias Buri, Rothrist (CH); Samuel Rentsch, Aarburg (CH); Cécile Ganneau, Saint Louis (CH)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/394,897

(22) PCT Filed: May 6, 2013

(86) PCT No.: PCT/EP2013/059377
§ 371 (c)(1),
(2) Date: Oct. 16, 2014

(87) PCT Pub. No.: WO2013/167527
PCT Pub. Date: Nov. 14, 2013

(65) Prior Publication Data
US 2015/0128830 A1     May 14, 2015

Related U.S. Application Data

(60) Provisional application No. 61/648,644, filed on May 18, 2012.

(30) Foreign Application Priority Data

May 11, 2012   (EP) ..................... 12167664

(51) Int. Cl.
| C09C 1/02 | (2006.01) |
| D21H 19/52 | (2006.01) |
| D21H 17/28 | (2006.01) |
| D21H 17/26 | (2006.01) |
| D21H 19/38 | (2006.01) |
| D21H 19/42 | (2006.01) |
| D21H 17/67 | (2006.01) |
| D21H 17/69 | (2006.01) |
| A24D 1/00 | (2020.01) |
| D21H 17/00 | (2006.01) |

(52) U.S. Cl.
CPC .............. *C09C 1/021* (2013.01); *A24D 1/00* (2013.01); *D21H 17/00* (2013.01); *D21H 17/26* (2013.01); *D21H 17/28* (2013.01); *D21H 17/675* (2013.01); *D21H 17/69* (2013.01); *D21H 19/385* (2013.01); *D21H 19/42* (2013.01); *D21H 19/52* (2013.01); *C01P 2004/61* (2013.01); *C01P 2004/62* (2013.01); *C01P 2006/22* (2013.01); *C01P 2006/60* (2013.01)

(58) Field of Classification Search
CPC .............. C01P 2004/61; C01P 2004/62; C01P 2006/22; C01P 2006/60; C09C 1/021; D21H 17/00; D21H 17/26; D21H 17/28; D21H 17/675; D21H 17/69; D21H 19/385; D21H 19/42; D21H 19/52

See application file for complete search history.

(56) References Cited

U.S. PATENT DOCUMENTS

| 5,708,162 | A | 1/1998 | Hilbig et al. |
| 6,939,961 | B1 | 9/2005 | Schlesiger |
| 7,601,212 | B2 | 10/2009 | Sabesan et al. |
| 9,365,723 | B2* | 6/2016 | Gane ...................... D21H 17/00 |
| 9,611,587 | B2* | 4/2017 | Gantenbein ............. C09C 1/021 |
| 2003/0017271 | A1* | 1/2003 | Sikkar ...................... C09C 1/021 427/372.2 |
| 2004/0131854 | A1* | 7/2004 | Aho ....................... D21H 17/69 428/403 |
| 2007/0266898 | A1 | 11/2007 | Gane et al. |
| 2008/0072785 | A1 | 3/2008 | Suau et al. |
| 2011/0269887 | A1* | 11/2011 | Gane ....................... C09C 1/021 524/425 |
| 2014/0165877 | A1 | 6/2014 | Gene et al. |
| 2014/0165879 | A1 | 6/2014 | Gene et al. |
| 2015/0105260 | A1 | 4/2015 | Gantenbein et al. |

FOREIGN PATENT DOCUMENTS

| CN | 102363923 A | 2/2012 |
| DE | 1543116 A1 | 7/1969 |
| DE | 4411681 A1 | 10/1995 |
| EP | 1176255 A1 | 1/2002 |
| EP | 2505615 A1 | 3/2012 |

(Continued)

OTHER PUBLICATIONS

Nomura et al.,; Viscosity of Aqueous Solutions of Polysaccharides and Their Carboxylate Derivatives;Journal of Applied Polymer Science, vol. 41, 2959-2969 (1990).*
The International Search Report dated Jun. 20, 2013 for PCT Application No. PCT/EP2013/059377.
The Written Opinion of International Searching Authority dated Jun. 20, 2013 for PCT Application No. PCT/EP2013/059377.
Barba et al. "Synthesis and characterization of carboxymethylcelluloses from non-wood pulps II. Rheological behavior of CMC in aqueous solution." Cellulose 9:327-335, 2002.

(Continued)

*Primary Examiner* — Shuangyi Abu Ali
(74) *Attorney, Agent, or Firm* — ALGM LLP; Harry J. Guttman

(57) ABSTRACT

The present invention relates to an aqueous suspension of mineral pigment materials having high solids content, which contain dispersing agents and/or grinding agents based on renewable sources, and methods for preparing such a suspension and its use.

23 Claims, No Drawings

(56) References Cited

FOREIGN PATENT DOCUMENTS

| JP | 2005201725 A | | 7/2005 |
|---|---|---|---|
| WO | 2006008657 A2 | | 1/2006 |
| WO | WO2010070002 | * | 6/2010 |
| WO | WO2010131016 | * | 11/2010 |

OTHER PUBLICATIONS

EPO, Extended European Search Report, in related European patent application No. 12167664.7, dated Feb. 4, 2013, 4 pages.
EPO, Decision to Grant, in related European patent application No. 12167664.7, dated Jan. 22, 2015, 2 pages.
CIPO, Office Action, in related Canadian patent application No. 2,870,803, dated Feb. 26, 2016, 3 pages.
CIPO, Response to Office Action dated Feb. 26, 2016, in related Canadian patent application No. 2,870,803, dated Aug. 25, 2016, 34 pages.
CIPO, Notice of Allowance, in related Canadian patent application No. 2,870,803, dated Nov. 29, 2016, 1 page.
SIPOPRC, Office Action, in related Chinese patent application No. 201380024607.7, dated Jun. 19, 2015, 13 pages.
SIPOPRC, Office Action, in related Chinese patent application No. 201380024607.7, dated Feb. 16, 2016, 5 pages.
SIPOPRC, Office Action, in related Chinese patent application No. 201380024607.7, dated May 24, 2016, 5 pages.
SIPOPRC, Notice of Allowance, in related Chinese patent application No. 201380024607.7, dated Sep. 26, 2016, 2 pages.
JPO, Office Action, in related Japanese patent application No. 2015-510763, dated Feb. 23, 2016, 6 pages.
JPO, Office Action, in related Japanese patent application No. 2015-510763, dated Aug. 9, 2016, 2 pages.
JPO, Office Action, in related Japanese patent application No. 2015-510763, dated Mar. 14, 2017, 2 pages.
JPO, Decision to Allowance, in related Japanese patent application No. 2015-510763, dated Apr. 4, 2017, 1 page.
KIPO, Office Action, in related Korean patent application No. 10-2014-7032657, dated Mar. 21, 2016, 6 pages.
KIPO, Office Action, in related Korean patent application No. 10-2014-7032657, dated Sep. 29, 2016, 4 pages.
KIPO, Notice of Allowance, in related Korean patent application No. 10-2014-7032657, dated Mar. 28, 2017, 1 page.
Rospatent, Office Action, in related Russian patent application No. 2014150042, dated Jun. 30, 2016, 3 pages.
Rospatent, Decision on Grant, in related Russian patent application No. 2014150042, dated Nov. 3, 2016, 7 pages.
TIPO, Search Report and Examination Report, in related Taiwanese patent application No. 102116033, dated Oct. 7, 2014, 5 pages.
TIPO, Notice of Allowance, in related Taiwanese patent application No. 102116033, dated Mar. 16, 2015, 3 pages.
IPA, First Examination Report, in related Indian patent application No. 2208/MUMNP/2014, dated Sep. 11, 2018, 4 pages.

* cited by examiner

SUSTAINABLE ADSORBABLE POLYMERS

CROSS-REFERENCE TO RELATED APPLICATIONS

This application is a U.S. national phase of PCT Application No. PCT/EP2013/059377, filed May 6, 2013, which claims priority to European Application No. 12167664.7, filed May 11, 2012 and U.S. Provisional Application No. 61/648,644, filed May 18, 2012.

The present invention relates to aqueous suspensions of mineral pigment materials having high solids content. In particular, the present invention relates to high solids mineral pigment suspensions, which contain additives based on renewable sources, and methods for preparing such suspensions.

Mineral materials are among the main constituents in paints, plastic, paper or paper coating colours. Mineral materials such as calcium carbonate, may provide improvements, for example, in paper and painting quality and agriculture properties, notably relative to their optical properties.

For reasons of applicability, transport, storage and drying costs, it is especially useful to produce mineral materials in form of high solids suspensions, i.e. suspensions where the minority in respect to total weight of the suspension is water. Such high solid suspensions require usually the addition of a dispersing agent or grinding aid in order to maintain the suspension stability, pumpability and/or to allow grinding of such suspensions.

The commonly used dispersing agents or grinding aids, which are efficient for the production and stabilisation of such high solids mineral pigments material suspensions are mainly petro-chemistry based polymers such as salts of polycarboxylates, for example, sodium polyacrylate. However, the use of such petroleum derived products is not desirable from an environmental point view. In particular, to follow the Kyoto protocol and to reduce fossil $CO_2$ pollution of the atmosphere during combustion of the final goods, it is aimed at switching from petro-chemistry based polymers to polymers having a lower carbon dioxide footprint, for example, to polymers which are derived from natural or renewable resources.

FR 2 939 055 describes dispersing agents and/or grinding aids based on homopolymers or copolymers of acrylic acid, where the acrylic acid is obtained from glycerol. FR 2 932 804 describes polymers based acrolein and copolymers acrolein/acrylic acid, where the acrolein is obtained from glycerol. However, the process of producing acrolein and acrylic acid from glycerol is very complicated and expensive. Furthermore, harmful intermediate and by-products can be created during the preparation of such bio-based unsaturated monomers. It is also well known that the storage of monomers such as acrylic unsaturated monomers, especially acrolein storage and the polymerization processes need important safety precautions because the monomers are highly reactive, and an uncontrolled polymerization reaction can lead to major incidents for humans and installations.

Therefore, there is a need for dispersing agents and grinding aids, which can be derived from renewable, low toxic resources, and the starting material and the production process of which are less of a security issue.

Accordingly, it is an object of the present invention to provide dispersing agents and grinding aids, which are at least partly derived from renewable natural polymer resources. Furthermore, it would be desirable to provide dispersing agents and grinding aids which can be stored without any safety precautions and do not require a complicated preparation process. It would also be desirable to provide dispersing agents and grinding aids, which can be produced without generating harmful by-products or intermediate products. In addition the dispersing agent can be produced at high solids content in order to be cost effective with respect to production capacity and transport. It is also important to have a high concentration of the dispersant to avoid unnecessary dilution of the concentrated mineral suspension. The environmental benefits are that less water needs to be transported and thermal or mechanical up concentration steps, which are energy consuming operations, can be avoided or at least limited.

It is also an object of the present invention to provide high solids aqueous suspensions of mineral pigment material, which are fluid but contain only low amounts of petro-chemistry based dispersing agents or grinding agents or do not contain petro-chemistry based dispersing agents or grinding agents at all.

A further object of the present invention is to reduce or eliminate fossil based dispersants or grinding agents to follow at most the Kyoto protocol, which aims at the reduction of fossil $CO_2$ pollution of the atmosphere during combustion of the final goods. The Kyoto Protocol is an international agreement linked to the United Nations Framework Convention on Climate Change. The major feature of the Kyoto Protocol is that it sets binding targets for 37 industrialized countries and the European community for reducing greenhouse gas (GHG) emissions. This amounts to an average of five per cent against 1990 levels over the five-year period 2008 to 2012. The Kyoto Protocol was adopted in Kyoto, Japan, on 11 Dec. 1997 and entered into force on 16 Feb. 2005.

The foregoing and other objects are solved by the subject-matter as defined herein in the independent claims.

According to one aspect of the present invention, an aqueous suspension is provided, comprising
 a mineral pigment material, and
 at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon,
 wherein the at least one modified polysaccharide is present in an amount from 0.05 wt.-% to 5.0 wt.-%, based on the total weight of the solids in the suspension,
 the Brookfield viscosity of the aqueous suspension is between 50 and 1500 mPa·s at 20° C., and
 the solids content of the suspension is from more than 50 to 82 wt.-%, based on the total weight of the suspension.

According to another aspect of the present invention, a process for preparing an aqueous suspension is provided, comprising the steps of,
 a) proving a mineral pigment material,
 b) providing water,
 c) providing at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{13}C$ to $^{14}N$ in the range from 400 to 890 transformations per hour and per gram carbon, d) contacting the mineral pigment material of step a) and/or the at least one modified polysaccharide of step c) with the water of step b), and e) contacting the at least one modified polysaccharide of step c) and the mineral pigment material before and/or during and/or after step d) and adjusting the solids content of the obtained suspension so that it is from more than 50 to 82 wt.-%, based on the total weight of the suspension, wherein the at least one modified polysaccharide is added in an amount from 0.05 wt.-% to 5.0 wt.-%, based on the total weight of the solids in the suspension, and such that the Brookfield viscosity of the aqueous slurry is between 50 and 1500 mPa·s at 20° C.

According to yet another aspect of the present invention, an aqueous suspension is provided, comprising a mineral pigment material, and at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{13}C$ to $^{14}N$ in the range from 400 to 890 transformations per hour and per gram carbon and wherein the modified polysaccharide is supplied with a concentration from 10 to 45 wt.-% wherein the at least one modified polysaccharide is present in an amount from 0.05 wt.-% to 5.0 wt.-%, based on the total weight of the solids in the suspension, the Brookfield viscosity of the aqueous suspension is between 50 and 1500 mPa·s at 20° C., and the solids content of the suspension is from more than 50 to 82 wt.-%, based on the total weight of the suspension.

According to still another aspect of the present invention, a process for preparing an aqueous suspension is provided, comprising the steps of, a) proving a mineral pigment material, b) providing water, c) providing at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon and wherein the modified polysaccharide is supplied with a concentration from 10 to 45 wt.-% d) contacting the mineral pigment material of step a) and/or the at least one modified polysaccharide of step c) with the water of step b), and e) contacting the at least one modified polysaccharide of step c) and the mineral pigment material before and/or during and/or after step d) and adjusting the solids content of the obtained suspension so that it is from more than 50 to 82 wt.-%, based on the total weight of the suspension, wherein the at least one modified polysaccharide is present in an amount from 0.05 wt.-% to 5.0 wt.-%, based on the total weight of the solids in the suspension, and such that the Brookfield viscosity of the aqueous slurry is between 50 and 1500 mPa·s at 20° C.

According to still another aspect of the present invention, the use of at least one modified polysaccharide as dispersing agent and/or grinding aid is provided, wherein the at least one modified polysaccharide has a degree of carboxylation in the range from 0.6 to 2.0, and has an intrinsic viscosity in the range from 3 to 300 ml/g, and wherein the carbon of the at least one modified polysaccharide shows a rate of nuclear transformation of $^{14}C$ to $^{14}N$ in the range from 400 to 890 transformations per hour and per gram carbon.

According to yet another aspect of the present invention, the use of least one modified polysaccharide as dispersing agent and/or grinding aid is provided, wherein the at least one modified polysaccharide has a degree of carboxylation in the range from 0.6 to 2.0, and has an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon, is supplied with a concentration from 10 to 45 wt.-%.

According to still another aspect of the present invention, the use of the aqueous suspension according to the invention in paper, plastics, paint, food, pharmaceuticals, drinking water and/or agriculture applications is provided.

Advantageous embodiments of the inventive method are defined in the corresponding sub-claims.

According to one embodiment the mineral pigment material is a calcium carbonate containing material, preferably selected from calcium carbonate, calcium carbonate containing minerals, mixed carbonate based fillers, or mixtures thereof. According to another embodiment the calcium carbonate is ground calcium carbonate, precipitated calcium carbonate, modified calcium carbonate, or mixtures thereof. According to still another embodiment the mineral pigment material is in form of particles having a weight median particle size $d_{50}$ from 0.1 to 100 μm, from 0.25 to 50 μm, or from 0.3 to 5 μm, preferably from 0.4 to 3.0 μm.

According to one embodiment the at least one modified polysaccharide is a carboxymethyl derivate and/or a carboxymethyl hydroxypropyl derivate and/or a carboxymethyl hydroxyethyl derivate of a polysaccharide, an anionic starch, an anionic guar, or a mixture thereof, preferably the at least one modified polysaccharide is carboxymethyl cellulose. According to another embodiment the carbon of the at least one modified polysaccharide shows a rate of nuclear transformation of $^{14}C$ to $^{14}N$ in the range from 550 to 850 transformations per hour and per gram carbon. According to still another embodiment the degree of carboxylation of the at least one modified polysaccharide is in the range from 0.8 to 1.9, preferably from 0.9 to 1.7, and more preferably from 1.0 to 1.6. According to still another embodiment the intrinsic viscosity of the at least one modified polysaccharide is in the range of 5 to 220 ml/g, and preferably of 10 to 200 ml/g.

According to one embodiment the carboxylic groups of the at least one modified polysaccharide are at least partly neutralized by one or more monovalent and/or one or more polyvalent cations, preferably selected from $Li^+$, $Na^+$, $Sr^{2+}$, $Ca^{2+}$, $Mg^{2+}$, or mixtures thereof. According to another embodiment the at least one modified polysaccharide is present in an amount from 0.1 to 3 wt.-%, based on the total weight of the solids in the suspension, preferably from 0.2 to 2.0 wt.-%, more preferably from 0.25 to 1.5 wt.-%, and most preferably from 0.5 to 1.25 wt.-%.

According to one embodiment the Brookfield viscosity of the aqueous suspension is between 80 and 1000 mPa·s at 20° C., and preferably between 100 and 700 mPa·s at 20° C. According to another embodiment the solids content of the suspension is from 55 to 80 wt.-%, preferably 60 to 79 wt.-%, and more preferably from 65 to 78 wt.-%, based on the total weight of the suspension.

According to one embodiment intrinsic viscosity of the at least one modified polysaccharide provided in step c) is adjusted by addition of at least hydrogen peroxide, preferably under alkaline conditions, optionally in presence of an alkali peroxide, in two to five steps. According to another embodiment the carboxylic groups of the at least one modified polysaccharide are at least partly neutralized by adding prior and/or during and/or after process step e) one or more monovalent and/or polyvalent cations, preferably selected from $Li^+$, $Na^+$, $Sr^{2+}$, $Ca^{2+}$, $Mg^{2+}$, or a mixture thereof, and most preferably from $Ca^{2+}$ added in form of $Ca(OH)_2$ in suspension and/or solution. According to still another embodiment the carboxylic groups of the at least one modified polysaccharide are at least partly neutralized by adding prior and/or during and/or after process step e) one or more polyvalent cations, in situ formed, by adding an acid, preferably $H_3PO_4$, and/or acidic reacting salt such as $NaH_2PO_4$, preferably $CaHPO_4$, and/or at least one partially neutralized polysaccharide.

According to one embodiment the process further comprises the step f) of grinding the suspension obtained in step e).

According to one embodiment the aqueous suspension is used to reduce sun light and UV exposure of plant leaves.

It should be understood that for the purpose of the present invention, the following terms have the following meaning.

Throughout the present document, the "degree of carboxylation" is specified in respect to the total amount of hydroxyl groups per unmodified monomer unit of the original polysaccharide.

"Ground calcium carbonate" (GCC) in the meaning of the present invention is a calcium carbonate obtained from natural sources, such as limestone, marble, calcite or chalk, and processed through a wet and/or dry treatment such as grinding, screening and/or fractionating, for example, by a cyclone or classifier.

The term "intrinsic viscosity" as used in the context of the present invention is a measure of the capability of a polymer in solution to enhance the viscosity of the solution and is specified in ml/g.

For the purpose of the present invention, a "mineral pigment" encompasses an inorganic substance that is solid at room temperature, i.e. at a temperature of 20° C.±2° C., insoluble in water, i.e. less than 1 wt.-% of the substance is soluble in water at room temperature, and has a definite chemical composition and can be crystalline or amorphous or mixtures thereof.

A "mineral pigment material" in the meaning of the present application may encompass materials such as calcium carbonate such as calcite, marble, limestone and chalk, talc, dolomite, mica, titanium dioxide, aluminiumtrihydrate such as Gibbsit, Bayern, magnesium hydroxide such as brucite, hydromagnesite, etc.

"Modified calcium carbonate" (MCC) in the meaning of the present invention may feature a natural ground or precipitated calcium carbonate with an internal structure modification or a surface-reaction product.

"Modified polysaccharides" in the meaning of the present invention are polysaccharides, wherein at least a part of the hydroxyl groups are carboxylated. Additionally, the modified polysaccharides may contain other modifications such as aldehyde groups or modification in respect to molecular weight expressed indirectly by the intrinsic viscosity.

Throughout the present document, the "particle size" of a mineral pigment material or a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ value between 0.2 and 5 µm, a Sedigraph 5100 device from the company Micromeritics, USA, can be used.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be vaterite, calcite or aragonite.

Throughout the present application and in the claims, the "rate of nuclear carbon transformation from $^{14}C$ to $^{14}N$" of the modified polysaccharide is measured using the traditional methods for analysis of the rate of nuclear carbon transformation from $^{14}C$ into $^{14}N$ known hitherto. These methods are based on a stage of preparation consisting of a thermal decomposition at a high temperature (approximately 1000° C.) by combustion or calcination of the sample for analysis, followed by collection of the released carbon dioxide which is trapped at low temperature before its reduction, by catalytic hydrogenation, into elemental carbon atoms, the composition of which in $^{13}C/^{12}C$ and $^{15}N/^{14}N$ isotopes, and also $^{14}C$ isotopes, is measured by a mass spectrophotometer.

Throughout the present application and in the claims, the "rate of nuclear carbon transformation from $^{14}C$ to $^{14}N$" of the modified polysaccharide is determined as described for example in ASTM D 6866 "Determining the Biobased Content of Solid, Liquid, and Gaseous Samples Using Radiocarbon Analysis". The rate of nuclear carbon transformation from $^{14}C$ to $^{14}N$ is specified in decay/h/g.

For the purpose of the present invention, the term "viscosity" refers to Brookfield viscosity. The Brookfield viscosity is measured by a Brookfield (Typ RVT) viscosimeter at 20° C.±2° C. at 100 rpm and is specified in mPa·s.

A "suspension" or "slurry" in the meaning of the present invention comprises insoluble solids and water, and optionally further additives and usually contains large amounts of solids and, thus, is more viscous and can be of higher density than the liquid from which it is formed.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventive aqueous suspension comprises a mineral pigment material, and at least one modified polysaccharide, wherein the at least one modified polysaccharide has a degree of carboxylation in the range from 0.6 to 2.0, has an intrinsic viscosity in the range from 3 to 300 ml/g, and is present in an amount from 0.05 wt.-% to 5.0 wt.-%, based on the total weight of the solids in the suspension. The carbon of the at least one modified polysaccharide shows a rate of nuclear transformation of $^{14}C$ to $^{14}N$ in the range from 400 to 890 transformations per hour and per gram carbon. The Brookfield viscosity of the aqueous suspension is between 50 and 1500 mPa·s at 20° C., and the solids content of the suspension is from more than 50 to 82 wt.-%, based on the total weight of the suspension.

In the following the details and preferred embodiments of the inventive aqueous suspension will be set out in more detail. It is to be understood that these technical details and embodiments also apply to the inventive process for preparing the suspensions and their use.

The Mineral Pigment Material

The aqueous suspension of the present invention comprises a mineral pigment material.

Examples for suitable mineral pigment materials are calcium carbonate such as calcite, marble, limestone and chalk, talc, dolomite, mica, or titanium dioxide, aluminium hydroxide and magnesium hydroxide.

According to one embodiment the mineral pigment material is a calcium carbonate containing material, preferably selected from calcium carbonate, calcium carbonate containing minerals, mixed carbonate based fillers, or mixtures thereof.

According to a preferred embodiment of the present invention, the mineral pigment material is a calcium carbonate. Calcium carbonate may be selected from ground calcium carbonate, also named heavy calcium carbonate, precipitated calcium carbonate, also named light calcium carbonate, modified calcium carbonate, or mixtures thereof.

Ground (or natural) calcium carbonate (GCC) is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention, the source of ground calcium carbonate (GCC) is selected from marble, chalk, calcite, dolomite, limestone, or mixtures thereof. Preferably, the source of ground calcium carbonate is selected from from marble and dolomitic marble.

According to one embodiment of the present invention the GCC is obtained by dry grinding. According to another embodiment of the present invention the GCC is obtained by wet grinding and optionally subsequent drying.

In general, the grinding step can be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by wellknown processes, e.g. by flocculation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment, the calcium carbonate containing material comprises one ground calcium carbonate. According to another embodiment of the present invention, the calcium carbonate containing material comprises a mixture of two or more ground calcium carbonates selected from different sources of ground calcium carbonate. For example, the at least one ground calcium carbonate may comprise one GCC selected from dolomite and one GCC selected from marble.

According to another embodiment, the calcium carbonate containing material consists of only one ground calcium carbonate. According to another embodiment of the present invention, the calcium carbonate containing material consists of a mixture of two or more ground calcium carbonates selected from different sources of ground calcium carbonate.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate containing material comprises one precipitated calcium carbonate. According to another embodiment of the present invention, the calcium carbonate containing material comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to another embodiment, the calcium carbonate containing material consists of only one precipitated calcium carbonate. According to another embodiment of the present invention, the calcium carbonate containing material consists of a mixture of two or more precipitated calcium carbonates selected from different crystalline forms and different polymorphs of precipitated calcium carbonate.

A modified calcium carbonate may feature a natural ground or precipitated calcium carbonate with a surface and/or internal structure modification, e.g., the calcium carbonate may be treated or coated with a hydrophobising surface treatment agent such as, e.g. an aliphatic carboxylic acid or a siloxane. Calcium carbonate may be treated or coated to become cationic or anionic with, for example, a sodium polyacrylate or polyDADMAC (polydiallyldimethylammonium chloride). According to a preferred embodiment of the present invention, the modified calcium carbonate is a surface-reacted calcium carbonate.

According to one embodiment of the present invention, the calcium carbonate containing material comprises one modified calcium carbonate. According to another embodiment of the present invention, the calcium carbonate containing material comprises a mixture of two or more modified calcium carbonates having different surface and/or internal structure modifications.

According to one embodiment of the present invention, the calcium carbonate containing material consists of one modified calcium carbonate. According to another embodiment of the present invention, the calcium carbonate containing material consists of a mixture of two or more modified calcium carbonates having different surface and/or internal structure modifications.

According to another embodiment the calcium carbonate containing material is a mixture of ground calcium carbonate and/or precipitated calcium carbonate and/or modified calcium carbonate.

According to one embodiment of the present invention, the calcium-carbonate containing minerals comprise dolomite.

According to a preferred embodiment, the mixed carbonate based fillers are selected from calcium associated with magnesium and analogues or derivatives, various matter such as clay or talc or analogues or derivatives, and mixtures of these fillers, such as, for example, talc-calcium carbonate or calcium carbonate-kaolin mixtures, or mixtures of natural calcium carbonate with aluminium hydroxide, mica or with synthetic or natural fibers or co-structures of minerals such as talc-calcium carbonate or talc-titanium dioxide or calcium carbonate-titanium dioxide co-structures.

According to one embodiment of the present invention, the mineral pigment material is in form of particles having a weight median particle size $d_{50}$ from 0.1 to 100 μm, preferably from 0.25 to 50 μm, more preferably from 0.3 to 5 μm, and most preferably from 0.4 to 3.0 μm.

The Modified Polysaccharide

In addition to the mineral pigment material, the aqueous suspension of the present invention comprises at least one modified polysaccharide having a degree of carboxylation in the range from 0.6 to 2.0, and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon. The at least one modified polysaccharide is present in an amount from 0.05 wt.-% to 5.0 wt.-%, based on the total weight of the solids in the suspension.

"Modified polysaccharides" in the meaning of the present invention are polysaccharides, wherein at least a part of the hydroxyl groups is carboxylated. Additionally, the modified polysaccharides may contain other modifications such as aldehyde groups.

Modified polysaccharides according to the present invention may comprise the following structure:

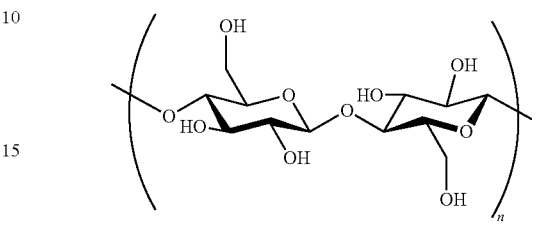

wherein a part of the hydroxyl groups is carboxylated and "n" is indirectly represented by the intrinsic viscosity.

Polysaccharides are polymeric carbohydrate structures, formed of repeating units (at least 10) joined together by glycosidic bonds. Depending on the spatial arrangement of the glycosidic bonds, one may distinguish between α- and β-glycosidic bonds. These structures may be linear, but may also contain various degrees of branching. Polysaccharides may also contain slight modifications of the repeating unit. Exemplary polysaccharides are starch, cellulose, or glycogen, but also structural polysaccharides such as cellulose and chitin.

According to a preferred embodiment of the present invention, the carbon of the at least one modified polysaccharide shows a rate of nuclear transformation of $^{14}C$ to $^{14}N$ in the range from 550 to 850 transformations per hour and per gram carbon. The rate of nuclear carbon transformation of $^{14}C$ to $^{14}N$ is a measure of the ratio of material that is derived from a renewable natural polymer source and is specified in decay/h/g.

Surprisingly, the inventors found that modified polysaccharides as defined above can control and adjust the viscosity of a high solids pigment material suspension and/or can improve or facilitate grinding of such suspension. Furthermore, the modified polysaccharides of the present invention can be easily prepared and stored without any special safety precautions.

According to one embodiment of the present invention, the at least one modified polysaccharide has a degree of substitution of the hydroxyl groups in the range from 0.8 to 1.9, preferably from 0.9 to 1.7, and more preferably from 1.0 to 1.6. According to another embodiment of the present invention, the at least one modified polysaccharide has a degree of substitution of the hydroxyl groups in the range from 0.6 to 1.1 and/or 1.3 to 2.0.

According to one embodiment of the present invention, the intrinsic viscosity of the at least one modified polysaccharide is in the range from 5 to 220 ml/g, and preferably from 10 to 200 ml/g. According to another embodiment of the present invention, the intrinsic viscosity of the at least one modified polysaccharide is in the range from 3 to 22 mg/l, 29 to 55 mg/l, 57 to 177 mg/l, and/or 180 to 300 mg/l.

According to another embodiment, the at least one modified polysaccharide has a degree of carboxylation of 1 or more, and an intrinsic viscosity in the range from 5 to 220 ml/g, preferably from 10 to 200 ml/g, and more preferably from 10 to 100 ml/g. According to still another embodiment, the at least one modified polysaccharide has a degree of carboxylation of less than 1, and an intrinsic viscosity in the range from 5 to 220 ml/g, preferably from 10 to 200 ml/g, and more preferably from 10 to 100 ml/g.

According to one embodiment of the present invention, the modified polysaccharide of the present invention has a pH from 4.5 to 12, preferably from 7 to 11, and more preferably from 8.0 to 10.5.

According to one embodiment of the present invention, the intrinsic viscosity of the at least one modified polysaccharide is in the range from 3 to 178 mg/1 at a pH from 4.5 to 9.5.

According to one embodiment of the present invention, the modified polysaccharide is produced and supplied in an aqueous solution of a concentration of 10 to 45 wt. %, preferably from 15 to 40 wt. %, more preferably from 15 to 30 wt. %.

According to one embodiment of the present invention, the at least one modified polysaccharide is a carboxymethyl derivate and/or a carboxymethyl hydroxypropyl derivate and/or a carboxymethyl hydroxyethyl derivate of a polysaccharide, an anionic starch, an anionic guar, or a mixture thereof.

According to a preferred embodiment of the present invention, the at least one modified polysaccharide is at least one carboxymethylcellulose (CMC).

Carboxymethylcellulose (CMC) may be prepared from cellulose by reaction with monochloroacetic acid in the presence of caustic soda to form the sodium salt of carboxymethylcellulose. Each repeating D-glycose unit contains three hydroxyl groups theoretically capable of etherification, to give a theoretically maximum charge density of three carboxylic groups per monomer unit (i.e., a theoretically degree of substitution of three). The molecular weight and the intrinsic viscosity of the carboxymethylcellulose-based binder materials can be adjusted by the treatment with hydrogen peroxide ($H_2O_2$). Reference is made to DE 1 543 116 A1 describing a method for the preparation of low viscous, water-soluble CMC by oxidative degradation with $H_2O_2$ (hydrogen peroxide) and to DE 44 11 681 A1 describing the dependency of the degradation of polysaccharide ether on the amount of oxidizing agent, temperature and duration of the treatment. DE44 11 681 A1 and U.S. Pat. No. 5,708,162A further describe the use of perborate for the preparation of low molecular weight polysaccharides.

The intrinsic viscosity can be adjusted by any method that is known to the person skilled in the art, e.g., by addition of peroxides, and the degree of carboxylation of modified polysaccharide can be adjusted by any method that is known to the person skilled in the art, e.g., by addition of monochloroacetic acid or salts thereof.

In a preferred embodiment of the present invention, the intrinsic viscosity is adjusted by a multiple step addition of peroxide, more preferred in two to five steps.

In a further preferred embodiment different peroxides are in use in the different steps, such as alkali peroxides, e.g., sodium peroxide in combination with hydrogen peroxide. According to an exemplary embodiment of the present invention, the peroxide for multiple step addition is a combination of hydrogen peroxide and alkali peroxide, where the amount of alkali peroxide controls the pH during the process.

According to another exemplary embodiment of the present invention, the intrinsic viscosity of the at least one modified polysaccharide provided in step b) is adjusted by addition of at least hydrogen peroxide, optionally in presence of an alkali peroxide, preferably in two to five steps. According to a preferred embodiment, the intrinsic viscosity of the at least one modified polysaccharide provided in step b) is adjusted under alkaline conditions by addition of at least hydrogen peroxide, optionally in presence of an alkali peroxide, preferably in two to five steps.

According to another preferred embodiment of the present invention, the at least one modified polysaccharide is an anionic starch.

The anionic starch is preferably prepared by chemical modification of starch with anionic groups selected from the group comprising carboxyl groups, carboxymethyl groups, carboxymethyl hydroxypropyl groups, carboxymethyl hydroxyethyl groups, phosphate groups, sulfonate groups and mixtures thereof. The anionic starch can be chosen from amongst the chemically modified starches originating from starches selected from the group comprising wheat starch, corn starch, rice starch, potato starch, tapioca starch, maranta starch, sorghum starch and mixtures thereof. In one preferred embodiment, the anionic starch is selected from those enriched in amylopectin, that is to say the chemically modified starch is preferably selected from the group consisting of rice starch, potato starch, and mixtures thereof. The anionic starch can also be obtained from genetically modified sources comprising amylopectin enriched starches. Methods for preparing such anionic starches are known by the skilled person. The molecular weight of the anionic starch can be adjusted by the treatment with hydrogen peroxide ($H_2O_2$), preferably under alkaline conditions.

According to another preferred embodiment of the present invention, the at least one modified polysaccharide is an anionic guar.

Guar comprises a natural heteropolysaccharide (guaran) consisting of galactose units and mannose units usually in the ratio of 1:2 and is the endosperm component of guar seeds. In general, guar comprises a linear chain of 1,4-linked β-D-mannopyranosyl units with 1,6-linked α-D-galactopyranosyl units. Guar seeds containing about 14 to 17 wt.-% husk, 35 to 42 wt.-% endosperm and 43 to 47 wt.-% embryo, are usually dry-milled and screened to separate out the endosperm which is the industrial guar of commerce. A guar derivative can be obtained, for example, by modifying the heteropolysaccharide through the use of enzymes, acids, oxidation media, temperature, radiation etc. Methods for preparing such guar derivatives are known to the skilled person. For example, a modification may be obtained by the use of a commercially available α-D-galactosidase enzyme which is useful to remove α-D-galactopyranosyl units. By controlling the length of time that the guaran is exposed to the α-D-galactosidase enzyme, the extent of removal of α-D-galactopyranosyl units from the linear chain of mannose units can be controlled. Additionally or alternatively, a modification of guar may be obtained by etherification of guar with propyleneoxide or ethyleneoxide resulting in a hydroxypropyl guar or hydroxyethyl guar.

According to one embodiment of the present invention, the anionic guar is a carboxymethyl guar (CMG) and/or carboxymethyl hydroxypropyl guar (CMHPG) and/or carboxymethyl hydroxyethyl guar (CMHEG). For example, carboxymethyl guar is obtained by reacting a guar with monochloroacetic acid in the presence of caustic soda.

A solution of modified polysaccharide can be concentrated, for example, by ultrafiltration or thermal drying. Dry modified polysaccharide is preferably produced by thermal drying, more preferably by spray drying and has a solids content of more than 90, preferably from 95 to 99.9 wt.-%, based on the total weight of the modified polysaccharide.

According to the present invention, the expression "at least one" modified polysaccharide means that one or more modified polysaccharides may be present in the aqueous suspension comprising the mineral pigment material. According to one embodiment, only one modified polysaccharide is present in the aqueous suspension comprising the mineral pigment material. According to another embodiment, a mixture of at least two modified polysaccharides is present in the aqueous suspension comprising the mineral pigment material.

The modified polysaccharide can be provided as solution or dry material. According to a preferred embodiment, the modified polysaccharide is in form of an aqueous solution.

According to one embodiment of the present invention, the at least one modified polysaccharide is in form of an aqueous solution having a modified polysaccharide concentration from 1 to 70 wt.-%, preferably from 5 to 50 wt.-%, more preferably from 10 to 45 wt.-%, and most preferably from 15 to 40 wt.-%, based on the total weight of the solution.

According to one embodiment, the at least one modified polysaccharide is present in the aqueous suspension in an amount from 0.1 to 3 wt.-%, based on the total weight of the solids in the suspension, preferably from 0.2 to 2.0 wt.-%, and more preferably from 0.25 to 1.5 wt.-%, and most preferably from 0.5 to 1.25 wt.-%. According to another embodiment, the at least one modified polysaccharide is present in the aqueous suspension in an amount from 0.05 to 0.55 wt.-%, from 0.60 to 0.65 wt.-%, from 0.75 to 0.90 wt.-% and/or from 0.95 to 1.95 wt.-%, based on the total weight of the solids in the suspension.

According to one optional embodiment of the present invention, the carboxylic groups of the at least one modified polysaccharide are at least partly neutralized by one or more monovalent and/or polyvalent cations, preferably selected from $Li^+$, $Na^+$, $K^+$, $Sr^{2+}$, $Ca^{2+}$, $Mg^{2+}$, or mixtures thereof. Additionally or alternatively, the carboxylic groups of the at least one modified polysaccharide are at least partly neutralized by one or more trivalent cations, preferably selected from $Al^{3+}$ and/or $Fe^{3+}$.

According to one optional embodiment, the carboxylic groups of the at least one modified polysaccharide may be at least partly neutralized by one or more monovalent cations. Preferably, the monovalent cations are selected from $Li^+$, $Na^+$, $K^+$, or mixtures thereof.

According to another optional embodiment, the carboxylic groups of the at least one modified polysaccharide are at least partly neutralized by one or more polyvalent cations. Preferably, the polyvalent cations are selected from $Sr^{2+}$, $Ca^{2+}$, $Mg^{2+}$, or mixtures thereof, and most preferably from $Ca^{2+}$ added in form of $Ca(OH)_2$ in suspension and/or solution. According to a preferred embodiment, the carboxylic groups of the at least one modified polysaccharide are at least partly neutralized by $Ca^{2+}$ cations and the $Ca^{2+}$ is produced in situ by addition of partially neutralized polysaccharides and/or addition of an acid.

It was found by the inventors that the addition of monovalent cations, and in particular the addition of polyvalent cations, to the suspension provides further advantages and especially provides improved adsorption properties of the at least one modified polysaccharide to the surface of the mineral. This may enhance the effectiveness of the modified polysaccharide of the present invention as dispersing agent and/or grinding aid. The inventors of the present invention also found that the addition of a combination of monovalent cations and polyvalent cations may enhance the effectiveness of the modified polysaccharide as dispersing agent and/or grinding aid particularly well.

According to one embodiment, the aqueous suspension according to the present invention comprises the one or more monovalent and/or one or more polyvalent cations in an amount from 0.1 to 5 wt.-%, preferably from 2 to 3 wt.-%, based on the total weight of the dry partially or fully neutralized salt of the at least one modified polysaccharide. The amount of $Ca(OH)_2$ may be from 50 to 500 ppm, based on the total weight of the dry pigment solids in the aqueous mineral material suspension, preferably from 200 to 300 ppm.

According to one aspect of the present invention, the at least one modified polysaccharide is used as dispersing agent and/or grinding aid, wherein the at least one modified polysaccharide has a degree of carboxylation in the range from 0.6 to 2.0, and has an intrinsic viscosity in the range from 3 to 300 ml/g, and wherein the carbon of the at least one modified polysaccharide shows a rate of nuclear transformation of $^{14}C$ to $^{14}N$ in the range from 400 to 890 transformations per hour and per gram carbon.

According to one aspect of the present invention, the at least one modified polysaccharide is used as dispersing agent and/or grinding aid, wherein the at least one modified polysaccharide has a degree of carboxylation in the range from 0.6 to 2.0, and has an intrinsic viscosity in the range from 3 to 300 ml/g.

The Aqueous Suspension According to the Present Invention

The aqueous suspension according to the present invention comprises a mineral pigment material as defined above and at least one modified polysaccharide as defined above, wherein the at least one modified polysaccharide is present in an amount from 0.05 wt.-% to 5.0 wt.-%, based on the total weight of the solids in the suspension.

The Brookfield viscosity of the aqueous suspension according to the present invention is between 50 and 1500 mPa·s at 20° C. According to one embodiment of the present invention, the Brookfield viscosity of the aqueous suspension is between 80 and 1000 mPa·s at 20° C., and preferably between 100 and 700 mPa·s at 20° C. According to another embodiment of the present invention, the Brookfield viscosity of the aqueous suspension is between 50 and 270 mPa·s at 20° C., between 295 and 480 mPa·s at 20° C., between 485 and 920 mPa·s at 20° C., between 960 and 1010 mPa·s at 20° C. and/or between 1020 and 1500 mPa·s at 20° C.

The solids content of the aqueous suspension according to the present invention is from more than 50 to 82 wt.-%, based on the total weight of the suspension. According to one embodiment of the present invention, the solids content of the suspension is from 55 to 80 wt.-%, preferably from 60 to 79 wt.-%, and more preferably from 65 to 78 wt.-%, based on the total weight of the suspension. According to another embodiment of the present invention, the solids content of the suspension is from 52 to 59 wt.-%, from 62 to 67 wt.-%, from 69 to 71 wt.-% and/or from 77 to 82 wt.-%, based on the total weight of the suspension.

According to one embodiment of the present invention, the Brookfield viscosity of the aqueous suspension is between 485 and 1500 mPa·s at 20° C. and the solids content of the suspension is from 77 to 82 wt.-%, based on the total weight of the suspension, and/or the Brookfield viscosity of the aqueous suspension is between 50 and 920 mPa·s at 20° C. and the solids content of the suspension is from 52 to 59 wt.-%, based on the total weight of the suspension According to a preferred embodiment of the present invention, the aqueous suspension consists of a mineral pigment material, and at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon, wherein the at least one modified polysaccharide is present in an amount from 0.05 wt.-% to 5.0 wt.-%, based on the total weight of the solids in the suspension, the Brookfield viscosity of the aqueous suspension is between 50 and 1500 mPa·s at 20° C., and the solids content of the suspension is from more than 50 to 82 wt.-%, based on the total weight of the suspension.

According to another preferred embodiment of the present invention, the aqueous suspension consists of a mineral pigment material, and at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon, wherein the at least one modified polysaccharide is present in an amount from 0.05 wt.-% to 5.0 wt.-%, based on the total weight of the solids in the suspension, and wherein the carboxylic groups of the least one modified polysaccharide are at least partly neutralized by one or more monovalent and/or one or more polyvalent cations, and wherein the Brookfield viscosity of the aqueous suspension is between 50 and 1500 mPa·s at 20° C., and the solids content of the suspension is from more than 50 to 82 wt.-%, based on the total weight of the suspension.

According to another preferred embodiment of the present invention, the aqueous suspension comprises a mineral pigment material, and at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon, wherein the at least one modified polysaccharide is at least one carboxymethylcellulose, being present in an amount from 0.05 wt.-% to 5.0 wt.-%, based on the total weight of the solids in the suspension, and wherein the carboxylic groups of the least one modified polysaccharide are at least partly neutralized by one or more monovalent and/or polyvalent cations, and wherein the Brookfield viscosity of the aqueous suspension is between 50 and 1500 mPa·s at 20° C., and the solids content of the suspension is from more than 50 to 82 wt.-%, based on the total weight of the suspension.

According to one embodiment of the present invention, the aqueous suspension comprises ground calcium carbonate and/or precipitated calcium carbonate, and at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon, wherein the at least one modified polysaccharide is present in an amount from 0.05 to 5.0 wt.-%, based on the total weight of the solids in the suspension, and wherein the Brookfield viscosity of the aqueous suspension is between 50 and 1500 mPa·s at 20° C., and the solids content of the suspension is from more than 50 to 82 wt.-%, based on the total weight of the suspension.

According to one embodiment of the present invention, the aqueous suspension of the present invention has a pH value from 7 to 12, preferably from 8 to 11, and more preferably from 8.5 to 10.5. If necessary, the pH of the suspension may be adjusted by all means known in the art.

According to one preferred embodiment, the aqueous suspension of the present invention does not include an additional dispersing agent and/or grinding aid. According to another preferred embodiment, the aqueous suspension of the present invention does not include a purely petro-chemistry based dispersing agent and/or grinding aid such as petro-chemistry based homopolymers or copolymers of polycarboxylic acid salts based on, for example, acrylic acid, methacrylic acid, maleic acid, fumaric acid or itaconic acid and acrylamide or mixtures thereof.

The aqueous suspension according to the present invention can be used in paper, plastics, paint, food, feed, pharmaceuticals, drinking water and/or agriculture applications.

According to one embodiment the aqueous suspension according to the present invention is used in the wet end process of a paper machine, in cigarette paper and/or coating applications, as support for rotogravure and/or offset and/or ink jet printing and/or continuous ink jet printing and/or flexography and/or electrophotography and/or decoration surfaces.

According to another embodiment, the aqueous suspension according to the present invention is used to reduce sun light and UV exposure of plant leaves.

According to still another embodiment, the aqueous suspension according to the present invention is used as fertilizer.

According to still another embodiment, the aqueous suspension according to the present invention is used in liquid or dried form in pharmaceuticals, such as to control gastric acid.

Method for Producing the Aqueous Suspension

A process for preparing an aqueous suspension according to the present invention comprises the steps of,
  a) proving a mineral pigment material,
  b) providing water,
  c) providing at least one modified polysaccharide having a degree of carboxylation in the range from 0.6 to 2.0 and an intrinsic viscosity in the range from 3 to 300 ml/g, wherein the carbon of the at least one modified polysaccharide shows a rate of nuclear transformation of $^{14}C$ to $^{14}N$ in the range from 400 to 890 transformations per hour and per gram carbon,
  d) contacting the mineral pigment material of step a) and/or the at least one modified polysaccharide of step c) with the water of step b), and
  e) contacting the at least one modified polysaccharide of step c) and the mineral pigment material of step a) before and/or during and/or after step d) and adjusting the solids content of the obtained suspension so that it is from more than 50 to 82 wt.-%, based on the total weight of the suspension,
  wherein the at least one modified polysaccharide is added in an amount from 0.05 wt.-% to 5.0 wt.-%, based on the total weight of the solids in the suspension, such that the Brookfield viscosity of the aqueous slurry is between 50 and 1500 mPa·s at 20° C.

According to one embodiment, in step d) the mineral pigment material of step a) is contacted with the water of step b) and the at least one modified polysaccharide of step c) is contacted with the water of step b), and in step e) the at least one modified polysaccharide of step c) and the mineral pigment material of step a) are contacted after step d).

According to another embodiment, in step d) the mineral pigment material of step a) is contacted with the water of step b), and in step e) the at least one modified polysaccharide of step c) and the mineral pigment material of step a) are contacted after step d).

The contacting of the mineral pigment material of step a) and/or the at least one modified polysaccharide of step c) with the water of step b) according to process step d) may be carried out under mixing and/or homogenizing and/or particle dividing conditions. The contacting of the at least one modified polysaccharide of step c) and the mineral pigment material of step a) before and/or during and/or after step d) according to process step e) may be carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany.

According to one embodiment of the present invention, process step d) and/or process step e) is carried out using a ploughshare mixer.

According to another embodiment of the present invention, process step d) and/or process step e) is carried out in a milling device, preferably in a ball mill, preferably in combination with a cyclone device that re-circulates agglomerates and/or aggregates formed during process step d) and/or process step e) back to the inlet of the milling device. A cyclone device enables the separation of particulate material such as particles, agglomerates or aggregates, into fractions of smaller and larger particulate material based on gravity.

According to an experimental embodiment, the mineral pigment material particles formed during process step d) and/or process step e) are divided into smaller particles. The term "dividing" as used in the present invention means that particles are split into smaller particles. This may be done by grinding, e.g. using a ball mill, a hammer mill, a rod mill, a vibrating mill, a roll crusher, a centrifugal impact mill, a vertical bead mill, an attrition mill, a pin mill, a hammer mill, a pulveriser, a shredder, a de-clumper, or a knife cutter. However, any other device that is able to divide the calcium carbonate containing composite particles formed during process step d) and/or process step e) into smaller particles may be used.

Process step d) and/or process step e) may be carried out at room temperature, i.e. at a temperature of 20° C.±2° C., or at other temperatures. According to one embodiment of the present invention, method step e) is carried out for at least 1 s, preferably for at least 1 min, e.g. for at least 15 min, 30 min, 1 hour, 2 hours, 4 hours, 6 hours, 8 hours, or 10 hours.

Further, Optional Process Steps

According to one optional embodiment, the intrinsic viscosity of the at least one modified polysaccharide provided in step c) is adjusted by addition of at least hydrogen peroxide, preferably under alkaline conditions, optionally in presence of an alkali peroxide, in two to five steps.

According to one optional embodiment, the carboxylic groups of the at least one modified polysaccharide are at least partly neutralized by adding prior and/or during and/or after process step e) one or more monovalent cations and/or one or more polyvalent cations. According to a preferred embodiment, the monovalent cations are selected from $Li^+$, $Na^+$, $K^+$, or mixtures thereof. Preferably, the polyvalent cations are selected from $Sr^{2+}$, $Ca^{2+}$, $Mg^{2+}$, or mixtures thereof, and most preferably from $Ca^{2+}$ added in form of $Ca(OH)_2$ in suspension and/or solution. According to a preferred embodiment, the carboxylic groups of the at least one modified polysaccharide are at least partly neutralized by $Ca^{2+}$ cations and the $Ca^{2+}$ is produced in situ by addition of partially neutralized polysaccharides and/or addition of an acid. Additionally or alternatively, the carboxylic groups of the at least one modified polysaccharides are at least partly neutralized by one or more trivalent cations, preferably selected from $Al^{3+}$ and/or $Fe^{3+}$.

The monovalent cations and/or polyvalent cations can also be added during the preparation of the at least one modified polysaccharide and/or the molecular weight adjustment process of the polysaccharide. For example, monovalent cations may be added during the neutralization of the modified polysaccharide in form of a base such as NaOH or KOH.

The monovalent cations may be added in the form of an aqueous salt solution, suspension or powder, and preferably in the form of a solution. The polyvalent cations may be added in the form of an aqueous salt solution, suspension or powder, and preferably in the form of a suspension.

The polyvalent cations may also be produced in-situ, e.g., by addition of an acid and/or acidic reacting salt and/or partially neutralized polysaccharide. The polyvalent cations may be added instead of monovalent cations or in combination with monovalent cations.

According to a preferred optional embodiment, the carboxylic groups of the at least one modified polysaccharide are at least partly neutralized by adding prior and/or during and/or after process step e) one or more polyvalent cations, in situ formed, by adding an acid, preferably $H_3PO_4$, or acidic reacting salt, for example, $NaH_2PO_4$, preferably $CaHPO_4$.

The acid or acidic reacting salt may be added in an amount from 50 to 500 ppm, based on the total weight of the solids in the suspension, preferably in an amount from 200 to 400 ppm, preferably in the form of an aqueous solution or suspension.

According to another preferred optional embodiment, the carboxylic groups of the at least one modified polysaccharide are at least partly neutralized by adding prior and/or during and/or after process step e) a combination of one or more polyvalent cations and one or more monovalent cations, wherein the polyvalent cations preferably are selected from $Sr^{2+}$, $Ca^{2+}$, $Mg^{2+}$, or mixtures thereof, and most preferably from $Ca^{2+}$ added in form of $Ca(OH)_2$ in suspension and/or solution, and wherein the monovalent cations preferably are selected from $Li^+$, $Na^+$, $K^+$, or mixtures thereof.

According to still another optional embodiment, the process according to the present invention further comprises the step f) of grinding the suspension obtained in step e).

The grinding process may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step f) may be carried out in batch or continuously, preferably continuously.

According to one optional embodiment, the carboxylic groups of the at least one modified polysaccharide are at least partly neutralized by adding prior and/or during and/or after grinding step f) one or more monovalent cations and/or one or more polyvalent cations as defined above.

According to one embodiment of the present invention, the grinding step f) is carried out at a temperature from 30 to 110° C., preferably from 40 to 100° C. Alternatively, the grinding step f) can be carried out at room temperature, i.e. at a temperature of 20° C.±2° C.

In one preferred embodiment of the present invention, grinding step f) is carried out until the fraction of pigment particles having a particle size of less than 1 µm is greater than 10 wt.-%, preferably greater than 20 wt.-%, more preferably greater than 30 wt.-%, and most preferably greater than 50 wt.-%, based on the total weight of the pigment particles, as measured with a Sedigraph 5100.

Additionally or alternatively, grinding step f) is carried out until the fraction of pigment particles having a particle size of less than 2 µm is greater than 20 wt.-%, preferably greater than 40 wt.-%, more preferably greater than 60 wt.-%, and most preferably greater than 90 wt.-%, based on the total weight of the pigment particles, as measured with a Sedigraph 5100.

Additionally or alternatively, grinding step f) is carried out until the fraction of pigment particles having a particle size of less than 0.2 µm is greater than 1 wt.-%, preferably greater than 5 wt.-%, more preferably greater than 10 wt.-%, and most preferably greater than 15 wt.-%, based on the total weight of the pigment particles, as measured with a Sedigraph 5100.

The mineral pigment particles obtained by the grinding step f) may have a weight median particle diameter $d_{50}$, measured according to the sedimentation method, in the range of from 0.1 µm to 10 µm, preferably from 0.5 µm to 8 µm and most preferably from 0.8 µm to 6 µm, for example from 1.0 µm to 5.5 µm. Additionally or alternatively, the mineral pigment particles obtained in step f) may have a $d_{98}$ of less than 25 µm, preferably of less than 20, more preferably of less than 15, and most preferably of less than 10 µm.

Optionally, the solids content of the aqueous suspension obtained by the process according to the present invention can be adjusted. The solids content of the aqueous suspension can be adjusted by the methods known to the skilled person. To adjust the solids content of an aqueous mineral material comprising suspension, the suspension may be partially or fully dewatered by a filtration, centrifugation or thermal separation process. For example, the suspension may be partially or fully dewatered by a filtration process such as nano filtration or a thermal separation process such as an evaporation process. Alternatively, water may be added to the solid mineral material until the desired solids content is obtained. Additionally or alternatively, a suspension having an appropriate lower content of solid particles may be added to the particulate material of the mixed suspension until the desired solid content is obtained. The solids content of the aqueous suspension obtained by the inventive process can also be adjusted by a concentration methods known to the skilled person.

The concentration of the aqueous suspension may be achieved by means of a thermal process, for example, in an evaporator under ambient, atmospheric pressure or at reduced pressure, or by means of a mechanical process, for example, in a filter press, such as nanofiltration, and/or centrifuge.

According to one optional embodiment, the process according to the present invention further comprises the step g) of adjusting the solids content of the suspension obtained in step e) and/or optional step f).

According to a preferred optional embodiment, the solids content of the aqueous suspension obtained by the process steps a) to e) is concentrated by a thermal process, preferably thermal drying, so that it is from 55 to 80 wt.-%, preferably from 60 to 79 wt.-%, and more preferably from 65 to 78 wt.-%, based on the total weight of the aqueous suspension.

According to another preferred embodiment the solids content of the aqueous suspension obtained by the process steps a) to f) is concentrated by a thermal process, preferably under reduced pressure, so that it is from 50 to 82 wt.-%, preferably from 60 to 79 wt.-%, and more preferably from 65 to 78 wt.-%, based on the total weight of the aqueous suspension.

The scope and interest of the invention will be better understood based on the following examples which are intended to illustrate certain embodiments of the invention and are non-limitative.

EXAMPLES

1. Measurement Methods

In the following, measurement methods implemented in the examples are described.

Brookfield Viscosity

The Brookfield viscosity of the pigment particles suspension was measured after one hour of production and after one minute of stirring at 20° C.±2° C. at 100 rpm by the use of a Brookfield viscometer type RVT equipped with an appropriate spindle.

Particle Size Distribution

The particle size distribution of the pigment particles was measured using a Sedigraph 5100 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Intrinsic Viscosity

The intrinsic viscosity was determined by a Schott AVS 370 system. The samples were dissolved in a 0.2 M NaCl solution, and subsequently, the pH was adjusted to 10 with NaOH. Measurements were performed at 25° C. (+/−0.1° C.) with a capillary type 0a and corrected using the Hagenbach correction. The intrinsic viscosity is automatically calculated with the software Dilution 370 (Software für Verdünnungsreihen, Version 6.2.1, SI Analytics, Germany).

Degree of Carboxylation

The degree of carboxylation was determined by conductometric titration according to Katz et al. "The determination of strong and weak acidic groups in sulfite pulps" (Svensk Paperstidn., 1984, 6, pp. 48-53).

Nuclear Carbon Transformation from $^{14}C$ to $^{14}N$

The rate of nuclear carbon transformation from $^{14}C$ to $^{14}N$ of the modified polysaccharide was measured, based on a stage of preparation consisting of a thermal decomposition at a high temperature (approximately 1000° C.) by combustion or calcination of the sample for analysis, followed by collection of the released carbon dioxide which is trapped at low temperature before its reduction, by catalytic hydrogenation, into elemental carbon atoms, the composition of which in $^{13}C/^{12}C$ and $^{15}N/^{14}N$ isotopes, and also $^{14}C$ isotopes, were measured by a mass spectrophotometer. The rate of nuclear carbon transformation from $^{14}C$ to $^{14}N$ is specified in transformation per hour and per gram carbon, which is expressed as decay/h/g.

Necessary preparation and pre-treatment of the sample material for radiocarbon dating was carried out by the $^{14}C$ laboratory of the Department of Geography at the University of Zurich (GIUZ). The dating itself was done by AMS (accelerator mass spectroscopy) with the tandem accelerator of the Institute of Particle Physics of the Swiss Federal Institute of Technology Zurich (ETH).

Wet Grinding

Without any specific indications, wet grinding was done in tap water (15° dH) in a horizontal attritor mill (Dyno-mill®, Type KDL-Pilot, Bachofen, Switzerland) having a volume of 1.4 liters in a recirculation mode, using zircon silicate beads of 0.6 to 1.2 mm diameter.

2. Materials

Mineral Pigment Materials

Mineral Pigment Material A:

Natural $CaCO_3$ from Italy, Avenza, having a $d_{90}$ value of 390 µm, a $d_{50}$ value of 165 µm, and a $d_{10}$ value of 20 µm.

Mineral Pigment Material B:

Natural $CaCO_3$ from Norway obtained by autogenously dry grinding in a ball mill 10 to 300 mm $CaCO_3$ rocks to a fineness corresponding to a $d_{50}$ value from 42 to 48 µm (calcium carbonate powder, containing no grinding aid or dispersant).

Mineral Pigment Material C:

Natural $CaCO_3$ from Austria, obtained trough dry grinding in a ball mill having a $d_{50}$ value of 7.5 µm, and a $d_{98}$ value of 32 µm.

Modified Polysaccharides

Carboxymethylcellulose 1 (CMC 1):

CMC 1 is commercially available from ACROS Organics, Belgium. CMC 1 has an $M_w$ of 250000 g/mol, a carboxylation degree of 1.2, and an intrinsic viscosity of 774 ml/g. The rate of nuclear carbon transformation is 630 decay/h/g.

Carboxymethylcellulose 2 (CMC 2):

CMC 2 is commercially available from Sigma-Aldrich, Germany (product name C5678). CMC 2 has a carboxylation degree of 0.7 and an intrinsic viscosity of 147 ml/g. The rate of nuclear carbon transformation is 715 decay/h/g.

Carboxymethylcellulose 3 (CMC 3):

CMC 3 is commercially available from CP Kelco, Germany (Cekol 2000). CMC 3 has a carboxylation degree according to the specifications of 0.75 to 0.85.

3. Examples 3.1. Comparative Example

Example 1

A slurry with a solid content of 45 wt.-% was prepared by mixing 2 wt.-%, based on the total weight of solids in the slurry, of the CMC 1 in form of a 9.9 wt.-% solution in water with the mineral pigment material A. Subsequently, the obtained mixture was wet ground with a 1.4-liter horizontal attritor mill by recirculation at 40-50° C. until a $d_{98}$ value of 3 µm was achieved.

The particle size distribution of the obtained pigment particles suspension, measured on a Sedigraph 5100, had a fraction of 92 wt.-% smaller than 2 µm, and 64 wt-% smaller than 1 µm. During the grinding process, the Brookfield viscosity increased to such an extent so that no further grinding at the high solids content concentration was possible. The slurry was diluted with water to keep grinding running.

The obtained pigment particle suspension had finally a solid content of 40.5 wt.-% and a Brookfield viscosity of 485 mPa·s. The Brookfield viscosity at a concentration of 52 wt.-% was far above 1500 mPa·s and very sticky.

3.2. Inventive Examples

Example 2

Preparation of Carboxymethylcellulose (CMC)

214 g CMC 1 was dissolved in 2460 ml water and stirred for 12 h at room temperature. Subsequently, the solution was heated to 80° C., and 800 µl of a $H_2O_2$ solution having a concentration of 30 wt.-%, based on the total amount of the solution, were added dropwise. After 5 h, 60 µl of said $H_2O_2$ solution were added dropwise. Thereafter, 2 times another 60 µl of said $H_2O_2$ solution were added dropwise in 1.5 h intervals. Finally, the solution was stirred for another 1.5 h at 80° C.

The obtained CMC had an intrinsic viscosity of 179 ml/g and a pH of 7.

Preparation of the Aqueous Pigment Particle Suspension

A slurry with a solid content of 60 wt.-% was prepared by mixing 2 wt.-%, based on the total weight of solids in the slurry, of the prepared CMC in form of a 9.9 wt.-% solution in water with the mineral pigment material A. Subsequently, the obtained mixture was wet ground with a 1.4-liter horizontal attritor mill by recirculation at 55° C. Furthermore, 300 ppm of $Ca(OH)_2$ were added during grinding. The grinding was carried out for 25 min until a $d_{98}$ value of 3 µm was achieved.

The particle size distribution of the obtained pigment particles suspension, measured on a Sedigraph 5100, had a fraction of 91 wt.-% smaller than 2 µm and 61 wt.-% smaller than 1 µm. The obtained pigment particle suspension had a solid content of 60.8 wt.-%, a pH of 9.4, and a Brookfield viscosity of 922 mPa·s.

Example 3

A slurry with a solid content of 60 wt.-% was prepared by mixing 2 wt.-%, based on the total weight of solids in the slurry, of a CMC prepared according Example 2 in form of a 9.9 wt.-% solution in water with the mineral pigment material A. Subsequently, the obtained mixture was wet ground with a 1.4-liter horizontal attritor mill by recirculation, and 300 ppm of a aqueous 10% $Ca(OH)_2$ suspension and 500 ppm ammonium zirconium carbonate (Bacote 20, MEL Chemicals) were added during wet grinding. The grinding was carried out for 25 min at 40-50° C. until a $d_{98}$ value of 3 µm was achieved.

The particle size distribution of the obtained pigment particles suspension, measured on a Sedigraph 5100, had a fraction of 91 wt.-% smaller than 2 µm and 61 wt.-% smaller than 1 µm. The obtained pigment particle suspension had a solid content of 61 wt.-%, a pH of 9.5, and a Brookfield viscosity of 940 mPa·s.

Example 4

Preparation of Carboxymethylcellulose (CMC)

90.8 g CMC 1 was dissolved in 1170 ml water and stirred for 12 h at room temperature. Subsequently, the solution was heated to 80° C., and 0.9 ml of a $H_2O_2$ solution having a concentration of 30 wt.-%, based on the total amount of the solution, were added dropwise. After 5.5 h, 0.5 ml of said $H_2O_2$ solution were added dropwise. After 4 h, another 0.2 ml of said $H_2O_2$ solution were added dropwise. Thereafter, the solution was stirred for 2 h and another 0.4 ml of said $H_2O_2$ solution were added drop wise. Finally, the solution was stirred for another 4 h at 80° C.

The obtained CMC had an intrinsic viscosity of 56 ml/g and a pH of 10, adjusted with aqueous 10% NaOH.

Preparation of the Aqueous Pigment Particle Suspension

A slurry with a solid content of 72.1 wt-% was prepared by mixing 0.69 wt.-% of the prepared CMC and 300 ppm of a aqueous 10% $Ca(OH)_2$ suspension with the mineral pigment material B. Subsequently, the obtained mixture was wet ground in a 1.4-liter horizontal attritor mill by recirculation at 40-50° C. until a $d_{50}$ value of 0.8 µm was achieved.

The particle size distribution of the obtained pigment particles suspension, measured on a Sedigraph 5100, had a fraction of 90 wt.-% smaller than 2 µm, 65 wt.-% smaller than 1 µm, and 15 wt-% smaller than 0.2 µm. The obtained pigment particle suspension had a solid content of 72.1 wt.-%, a pH of 9.6, and a Brookfield viscosity of 273 mPa·s.

Example 5

Preparation of Carboxymethylcellulose (CMC)

124 g CMC 1 was dissolved in 1299 ml water and stirred for 12 h at room temperature. Subsequently, the solution was heated to 80° C., and 2 ml of a $H_2O_2$ solution having a concentration of 30 wt.-%, based on the total amount of the solution, were added dropwise over a period of 20 minutes. After 4.5 h, 1.2 ml of said $H_2O_2$ solution were added dropwise over a period of 20 minutes. After 2 h additional 0.8 ml of said $H_2O_2$ solution were added drop wise over a period of 20 minutes. Thereafter, the solution was stirred for 7 h at 80° C.

The obtained CMC had an intrinsic viscosity of 23.7 ml/g and a pH of 10, adjusted with aqueous 10% NaOH.

Preparation of Pigment Particles Suspension

A slurry with a solid content of 73.8 wt-% was prepared by mixing 0.58 wt.-% of the prepared CMC with the mineral pigment material B. Subsequently, the obtained mixture was wet ground in a 1.4-liter horizontal attritor mill by recirculation at 40-50° C. until a $d_{50}$ value of 0.8 µm was achieved.

The particle size distribution of the obtained pigment particles suspension, measured on a Sedigraph 5100, had a fraction of 90 wt.-% smaller than 2 µm, 65 wt.-% smaller than 1 µm, and 15 wt-% smaller than 0.2 µm. The obtained pigment particle suspension had a solid content of 73.8 wt.-%, a pH of 8.4, and a Brookfield viscosity of 292 mPa·s.

Example 6

Preparation of Carboxymethylcellulose (CMC)

93 g CMC 1 was dissolved in 2255 ml water and stirred for 12 h at room temperature. Subsequently, the solution was heated to 80° C., and 0.34 ml of a $H_2O_2$ solution having a concentration of 30 wt.-%, based on the total amount of the solution, were added dropwise over a period of 20 minutes. After 3 h, 27 µl of said $H_2O_2$ solution were added. Finally, the solution was stirred for 2.5 h at 80° C.

The obtained CMC had an intrinsic viscosity of 178 ml/g and a pH of 10, adjusted with aqueous 10% NaOH after cooling to room temperature.

Preparation of Pigment Particles Suspension

A slurry with a solid content of 68.2 wt-% was prepared by mixing 0.93 wt.-% of the prepared CMC and 300 ppm $Ca(OH)_2$ with the mineral pigment material B. Subsequently, the obtained mixture was wet ground in a 1.4-liter horizontal attritor mill by recirculation at 40-50° C. until a $d_{50}$ value of 0.8 µm was achieved.

The particle size distribution of the obtained pigment particles suspension, measured on a Sedigraph 5100, had a fraction of 90 wt.-% smaller than 2 µm, 65 wt.-% smaller than 1 µm, and 15 wt-% smaller than 0.2 µm. The obtained pigment particle suspension had a solid content of 68.2 wt.-%, a pH of 9.5, and a Brookfield viscosity of 1016 mPa·s.

Example 7

Preparation of Carboxymethylcellulose (CMC)

3.4 kg CMC 1 was dissolved in 40 L water and stirred for 24 h at room temperature. Subsequently, the solution was heated to 80° C., and 150 ml of a a $H_2O_2$ solution having a concentration of 30 wt.-%, based on the total amount of the solution, were added dropwise over a period of 2 h. After 22 h, additional 20 ml $H_2O_2$ solution were added over a period of 2 h. Finally, the solution was stirred for 8 h at 80° C.

The obtained CMC had an intrinsic viscosity of 28 ml/g and a pH of 10, adjusted with aqueous 10% NaOH after cooling to room temperature. Subsequently, the CMC solution was spray dried.

Preparation of Pigment Particles Suspension

A slurry with a solid content of 76.1 wt-% was prepared by mixing 0.73 wt.-% of the prepared CMC and 0.03 wt.-% $H_3PO_4$ with the mineral pigment material B. Subsequently, the obtained mixture was wet ground in a 1.4-liter horizontal attritor mill by recirculation at 50° C. until a $d_{50}$ value of 0.8 µm was achieved.

The particle size distribution of the obtained pigment particles suspension, measured on a Sedigraph 5100, had a fraction of 90 wt.-% smaller than 2 µm, 65 wt.-% smaller than 1 µm, and 15 wt.-% smaller than 0.2 µm. The obtained pigment particle suspension had a solid content of 76.0 wt.-%, a pH of 8.7, and a Brookfield viscosity of 482 mPa·s.

Example 8

Preparation of Carboxymethylcellulose (CMC)

159 g CMC 2 was dissolved in water to obtain a solution having a concentration of 10.9 wt.-%, based on the total amount of the solution. The pH was adjusted to 8.1 with aqueous 10% NaOH.

Preparation of Pigment Particles Suspension

A slurry with a solid content of 60 wt.-% was prepared by mixing 0.86 wt.-% of the prepared CMC with the mineral pigment material C. Subsequently, the obtained mixture was wet ground in a 1.4-liter horizontal attritor mill by recirculation at 40-50° C.

The grinding process was carried out until the particle size distribution of the obtained pigment particles suspension, measured on a Sedigraph 5100, had a fraction of 90 wt.-% smaller than 2 µm, 61 wt.-% smaller than 1 µm, and 40 wt.-% smaller than 0.6 μm. The obtained pigment particle suspension had a solid content of 61 wt.-%, a pH of 8.7, and a Brookfield viscosity of 478 mPa·s.

Example 9

A slurry with a solid content of 60.7 wt.-% was prepared by mixing 0.53 wt.-% of the prepared CMC with the mineral pigment material C. Subsequently, the obtained mixture was wet ground in a 1.4-liter horizontal attritor mill by recirculation at 40-50° C. During grinding 100 ppm of $Ca(OH)_2$ were added in form of a 10 wt.-% aqueous $Ca(OH)_2$-suspension, based on the total weight of the suspension.

The grinding process was carried out until the particle size distribution of the obtained pigment particles suspension, measured on a Sedigraph 5100, had a fraction of 89 wt.-% smaller than 2 μm, 59 wt.-% smaller than 1 μm, and 38 wt.-% smaller than 0.6 μm. The obtained pigment particle suspension had a solid content of 62 wt.-% and a Brookfield viscosity of 478 mPa·s.

Example 10

Preparation of Carboxymethylcellulose (CMC)

159 g CMC 1 was dissolved in 1.95 l water and stirred for 12 h at room temperature. Subsequently, the solution was heated to 80° C., and 1 ml of a $H_2O_2$ solution having a concentration of 30 wt.-%, based on the total amount of the solution, were added dropwise over a period of 20 minutes. After 5 h, 0.2 ml of said $H_2O_2$ solution were added dropwise over a period of 20 minutes. After 4 h additional 0.9 ml of said $H_2O_2$ solution were added drop wise over a period of 20 minutes. After additional 2 h additional 0.9 ml of said $H_2O_2$ solution were added drop wise over a period of 20 minutes. Finally, the solution was stirred for 2 h at 80° C.

The obtained CMC had an intrinsic viscosity of 79 ml/g and a pH of 10, adjusted with aqueous 10% NaOH after cooling to room temperature. The final solids content of the CMC solution was 7.9 wt.-%.

Preparation of Pigment Particles Suspension

A slurry with a solid content of 51 wt.-% was prepared by mixing 0.3 wt.-% of the prepared CMC with the mineral pigment material B. Subsequently, the obtained mixture was wet ground in a 1.4-liter horizontal attritor mill by recirculation at 40-50° C. until 75 wt.-% of the particles were smaller than 1 μm.

The ground slurry was further thermally concentrated under steering at ambient pressure (temperature of heat exchanger oil: 140° C.) until a solids content of 67 wt.-%, based on the total weight of the slurry, was reached. During the concentration step additional 0.25 wt.-% of the prepared CMC were added.

The obtained pigment particle suspension had a Brookfield viscosity of below 1000 mPa·s.

Example 11

Preparation of Carboxymethylcellulose (CMC)

6.0 kg CMC 1 was dissolved in 80 kg water and stirred at 80° C. After complete dissolution (about 4 h), a $H_2O_2$ solution having a concentration of 30 wt.-%, based on the total amount of the solution, was added. 570 g of said $H_2O_2$ solution were added by means of a peristaltic pump. The solution was further stirred for 24 h at 80° C. After 24 h no hydrogen peroxide was detected anymore (tested with Titanium(IV) oxysulfate-sulfuric acid solution, No. 89532, commercially available from Sigma-Aldrich, Germany).

The obtained CMC dispersant had an intrinsic viscosity of 21 ml/g and a pH of 10, adjusted with aqueous 10% NaOH after cooling to room temperature.

Preparation of Pigment Particles Suspension

A slurry with a solid content of 74 wt.-% was prepared by mixing 0.4 wt.-% of the prepared CMC with the mineral pigment material A using an Ystral mixer (Dispermix, Ystral GmbH, Germany). Subsequently, 0.15 wt.-% $H_3PO_4$ were added to the mixture in form of a 10% aqueous solution and the obtained mixture was wet ground in a 200-liter vertical attritor mill using zircon silicate beads of 0.6 to 1.0 mm diameter. Additional 0.1 wt.-% of the prepared CMC was added in the middle of the mill. The mill was operated with a flow of 230 l/h. The slurry temperature at the mill inlet was 39° C. and at the outlet 99° C.

The particle size distribution of the obtained pigment particles suspension, measured on a Sedigraph 5100, had a fraction of 63.2 wt.-% smaller than 2 μm, and 40.5 wt.-% smaller than 1 μm. The obtained pigment particle suspension had a solid content of 75.8 wt.-%, a pH of 9.2, and a Brookfield viscosity of 935 mPa·s.

Example 12

Preparation of Carboxymethylcellulose (CMC)

0.533 kg of CMC 3 was dissolved in 1.6 kg water in a Lödige mixer under stirring at RT for 145 min before heating at 80° C. and addition by means of a peristaltic pump of 20 mL $H_2O_2$ solution having a concentration of 30 wt.-%, based on the total amount of the solution over a timer period of one hour. The mixture was let stir 3 h until total consummation of $H_2O_2$ (color test based on Titanium (IV) oxysulfate-sulfuric acid, Sigma-Adlrich product number 89532). 3 mL of $H_2O_2$ were then added, and reaction was stir 2 h more at 80° C. The final solution had a solids content of 26 wt %.

The obtained CMC dispersant had an intrinsic viscosity of 44 ml/g and a pH of 8.0, adjusted with aqueous 0.2M NaOH after cooling to room temperature.

Preparation of Pigment Particles Suspension

A slurry with a solid content of 70 wt-% was prepared by mixing 0.32 wt.-% of the prepared CMC with the mineral pigment material B. Subsequently, the obtained mixture was wet ground in a 1.4-liter horizontal attritor mill by recirculation at 40-50° C. until a $d_{50}$ value of 1.52 μm was achieved.

The particle size distribution of the obtained pigment particles suspension, measured on a Sedigraph 5100, had a fraction of 61 wt.-% smaller than 2 μm, 37 wt.-% smaller than 1 μm, and 22 wt-% smaller than 0.5 μm. The obtained pigment particle suspension had a solid content of 70.3 wt.-%, a pH of 8.8, and a Brookfield viscosity of 80 mPa·s.

Example 13

Preparation of Carboxymethylcellulose (CMC)

0.376 kg of CMC 1 was dissolved in 1.6 kg water in a Lödige mixer under stirred at RT for 180 min. The mixture was heated at 80° C. before addition of 25 mL $H_2O_2$ solution having a concentration of 30 wt.-%, based on the total amount of the solution. Solution was stir 3 h at 80° C. until total consummation of $H_2O_2$ (color test based on Titanium (IV) oxysulfate-sulfuric acid, Sigma-Adlrich product number 89532). Stirring was stopped overnight.

The obtained CMC dispersant had an intrinsic viscosity of 38.3 ml/g. At room temperature and under steering the pH was increased with a aqueous 10 wt % calcium hydroxide solution to pH 7.1 and subsequently to pH 8 with an aqueous 0.2 mol/L sodium hydroxide solution.

Preparation of Pigment Particles Suspension

A slurry with a solid content of 75 wt.-% was prepared by mixing 0.95 wt.-% of the prepared CMC with the mineral pigment material B. Subsequently, the obtained mixture was wet ground in a 1.4-liter horizontal attritor mill by recirculation at 40-50° C. until 92 wt % of the particles were smaller than 2 μm.

The particle size distribution of the obtained pigment particles suspension, measured on a Sedigraph 5100, had a fraction of 92 wt.-% smaller than 2 μm, 64.6 wt.-% smaller than 1 μm, and 40.4 wt-% smaller than 0.5 μm. The obtained pigment particle suspension had a solid content of 72.1 wt.-%, a pH of 9.2, and a Brookfield viscosity of 253 mPa·s.

Example 14

A slurry with a solid content of 74 wt.-% was prepared by mixing 0.8 wt.-% of the CMC prepared according to Example 11 with the mineral pigment material A using an Ystral mixer (Dispermix, Ystral GmbH, Germany). Subsequently, 0.15 wt.-% $H_3PO_4$ were added to the mixture in form of a 10% aqueous solution and the obtained mixture was wet ground in a 200-liter vertical attritor mill using zircon silicate beads of 0.6 to 1.0 mm diameter. Additional 0.2 wt.-% of the CMC prepared according to Example 11 was added in the middle of the mill. The mill was operated with a flow of 185 l/h. The slurry temperature at the mill inlet was 39° C. and at the outlet 96° C.

The particle size distribution of the obtained pigment particles suspension, measured on a Sedigraph 5100, had a fraction of 90.1 wt.-% smaller than 2 μm, and 60.3 wt.-% smaller than 1 μm. The obtained pigment particle suspension had a solid content of 75.8 wt.-% after grinding. After further addition of 0.15 wt.-% of the CMC prepared according to Example 11, the slurry had a pH of 9.3, and a Brookfield viscosity of 1160 mPa·s.

Example 15

The inventive aqueous pigment particle suspensions of Examples 11 and 14 were tested in paper coating applications. The coating trials were performed at the pilot coater of BASF in Ludwigshafen, Germany using a blade coating set up (stiff blade). A coating weight of 11 to 12 g/m² was applied on the employed paper.

Coating Trial 1

A coating color having a solid content of 65 wt.-% was prepared by mixing the pigment slurry of Example 11 with Styronal D628 binder (commercially available from BASF AG, Germany). The pigment to binder ratio was 100:10 (dry/dry). The pH of the coating color was adjusted to 8.9 and the viscosity was 120 mPa·s.

A wood free uncoated paper (Magno Star, 58 g/m²) was coated on both sides with 12 g/m² on each side of the prepared coating color at a speed of 1500 m/min. During the coating trial no runability problems were observed and a coated paper of good quality was obtained.

Coating Trial 2

A coating color having a solid content of 65 wt.-% was prepared by mixing the pigment slurry of Example 14 with Styronal D628 binder (commercially available from BASF AG, Germany). The pigment to binder ratio was 100:9 (dry/dry). The pH of the coating color was adjusted to 8.9 and the viscosity was 110 mPa·s.

A wood free pre-coated paper (Magno Star, 80 g/m²) was coated on both sides with 12 g/m² of the prepared coating color at a speed of 1500 m/min. During the coating trial no runability problems were observed and a coated paper of good quality was obtained.

The invention claimed is:

1. An aqueous suspension comprising
   a mineral pigment material, and
   at least one modified polysaccharide, as a dispersant, having a degree of carboxylation of hydroxyl groups in the range from 0.6 to 2.0 and an intrinsic viscosity in the range from 5 to 220 ml/g, wherein the carbon of the at least one modified polysaccharide shows a rate of nuclear transformation of $^{14}C$ to $^{14}N$ in the range from 400 to 890 transformations per hour and per gram carbon,
   wherein the at least one modified polysaccharide is present in an amount from 0.05 wt.-% to 5.0 wt.-%, based on the total weight of the solids in the suspension,
   wherein greater than or equal to 90% of the particles in the suspension are less than 2 μm,
   wherein the Brookfield viscosity of the aqueous suspension is between 100 and 1500 mPa·s at 20° C.,
   wherein the solids content of the mineral pigment in the suspension is from 55 to 80 wt.-%, based on the total weight of the suspension, and
   wherein an acrylic acid based dispersant is not present in the suspension.

2. The suspension according to claim 1, wherein the mineral pigment material is a calcium carbonate containing material, calcium carbonate, calcium carbonate containing minerals, mixed carbonate based fillers, or any mixture thereof.

3. The suspension according to claim 1, wherein the mineral pigment is calcium carbonate selected from the group consisting of ground calcium carbonate, precipitated calcium carbonate, modified calcium carbonate, and any mixture thereof.

4. The suspension according to claim 1, wherein the mineral pigment material is in the form of particles having a weight median particle size $d_{50}$ from 0.3 to 5 μm.

5. The suspension according to claim 1, wherein the mineral pigment material is in the form of particles having a weight median particle size $d_{50}$ from 0.4 to 3 μm.

6. The suspension according to claim 1, wherein the at least one modified polysaccharide is a carboxymethyl derivate and/or a carboxymethyl hydroxypropyl derivate and/or a carboxymethyl hydroxyethyl derivate of a polysaccharide, an anionic starch, an anionic guar, or any mixture thereof.

7. The suspension according to claim 1, wherein the at least one modified polysaccharide is carboxymethyl cellulose.

8. The suspension according to claim 1, wherein the carbon of the at least one modified polysaccharide shows a rate of nuclear transformation of $^{14}C$ to $^{14}N$ in the range from 550 to 850 transformations per hour and per gram carbon.

9. The suspension according to claim 1, wherein the degree of carboxylation of hydroxyl groups of the at least one modified polysaccharide is in the range from 0.8 to 1.9.

10. The suspension according to claim 1, wherein the degree of carboxylation of hydroxyl groups of the at least one modified polysaccharide is in the range from 0.9 to 1.7.

11. The suspension according to claim 1, wherein the degree of carboxylation of hydroxyl groups of the at least one modified polysaccharide is in the range from 1.0 to 1.6.

12. The suspension according to claim 1, wherein the intrinsic viscosity of the at least one modified polysaccharide is in the range of 10 to 200 ml/g.

13. The suspension according to claim 1, wherein the carboxylic groups of the at least one modified polysaccharide are at least partly neutralized by one or more monovalent and/or one or more polyvalent cations.

14. The suspension according to claim 1, wherein the carboxylic groups of the at least one modified polysaccharide are at least partly neutralized by one or more cations selected from the group consisting of $Li^+$, $Na^+$, $K^+$, $Sr^{2+}$, $Ca^{2+}$, $Mg^{2+}$ and any mixture thereof.

15. The suspension according to claim 1, wherein the at least one modified polysaccharide is present in an amount from 0.1 to 3 wt.-%, based on the total weight of the solids in the suspension.

16. The suspension according to claim 1, wherein the at least one modified polysaccharide is present in an amount from 0.2 to 2.0 wt.-%, based on the total weight of the solids in the suspension.

17. The suspension according to claim 1, wherein the at least one modified polysaccharide is present in an amount from 0.25 to 1.5 wt.-%, based on the total weight of the solids in the suspension.

18. The suspension according to claim 1, wherein the at least one modified polysaccharide is present in an amount from 0.5 to 1.25 wt.-%, based on the total weight of the solids in the suspension.

19. The suspension according to claim 1, wherein the Brookfield viscosity of the aqueous suspension is between 100 and 1000 mPa·s at 20° C.

20. The suspension according to claim 1, wherein the Brookfield viscosity of the aqueous suspension is between 100 and 700 mPa·s at 20° C.

21. The suspension according to claim 1, wherein the solids content of the suspension is from 60 to 79 wt.-%, based on the total weight of the suspension.

22. The suspension according to claim 1, wherein the solids content of the suspension is from 65 to 78 wt.-%, based on the total weight of the suspension.

23. The suspension according to claim 1, wherein the at least one modified polysaccharide is the only dispersant present in the suspension.

\* \* \* \* \*